US006301793B1

(12) United States Patent
Gottesman et al.

(10) Patent No.: US 6,301,793 B1
(45) Date of Patent: Oct. 16, 2001

(54) EQUATORIAL SUNDIAL APPARATUS UTILIZING ONE OR MORE CONCAVE CYLINDRICAL FOCUSING MIRRORS

(76) Inventors: William Gottesman, 100 Overlake Park; Karsten H. Weiss, 288 Flynn Ave. #13; Jerrold C. Manock, 14 Kingsland Ter., all of Burlington, VT (US) 05401

( * ) Notice: Subject to any disclaimer, the term of this patent is extended or adjusted under 35 U.S.C. 154(b) by 0 days.

(21) Appl. No.: 09/417,561

(22) Filed: Oct. 14, 1999

Related U.S. Application Data

(60) Provisional application No. 60/104,154, filed on Oct. 14, 1998.

(51) Int. Cl.[7] .................................................... C04B 49/04

(52) U.S. Cl. ............................ 33/270; 968/416; 968/415

(58) Field of Search ............................. 33/268, 269, 270, 33/271; 968/415, 416, 414; 368/79, 223

(56) References Cited

U.S. PATENT DOCUMENTS 89,585 * 5/1869 Johnson ................................ 33/270
2,931,102 * 4/1960 Thew ..................................... 33/270
3,786,570 * 1/1974 Davies .................................. 33/270
4,135,357 * 1/1979 Ashton .................................. 368/15
4,922,619 * 5/1990 Singleton .............................. 33/270
4,945,644 * 8/1990 Fuller .................................... 33/270
5,197,199 * 3/1993 Shrader ................................. 33/270

* cited by examiner

*Primary Examiner*—Diego Gutierrez
*Assistant Examiner*—R A Smith
(74) *Attorney, Agent, or Firm*—Eric R. Benson

(57) ABSTRACT

An equatorial sundial apparatus with an adjustable base assembly utilizing one or more concave cylindrical focusing mirrors. One of the benefits that is derived from this apparatus is the use of one or more concave cylindrical mirrors to project a focused beam of light onto a calibrated surface from which the time can be read. This sundial has the additional benefit of not suffering from blurring of the time indicator in a shadow or non-focused beam of light typical of other sundials. This sundial's focused light forms a sharply demarcated indicator from which time can be read to the minute. A further benefit of this apparatus is the ability to incorporate multiple concave cylindrical focusing mirrors to reduce the size of the visual field or screen where the time is read and to incorporate various shapes and designs for ornamental purposes without significant compromise of the sundials accuracy for telling time. An additional benefit of this apparatus is the ability to quickly, accurately and easily adjust the apparatus to the proper tilt upon setup according to the latitude where it will be located by means of an adjustable base assembly.

12 Claims, 10 Drawing Sheets

6
20
24
27

6
20
24
27

6
24
20
27

EQUATORIAL SUNDIAL APPARATUS UTILIZING ONE OR MORE CONCAVE CYLINDRICAL FOCUSING MIRRORS

This application claims benefit to Ser. No. 60/104,154 filed Oct. 14, 1998.

BACKGROUND OF THE INVENTION

1. Field of the Invention

The present invention relates to an equatorial sundial, and more particularly to a new and novel equatorial sundial with an adjustable base assembly that uses one or more concave cylindrical focusing mirrors to form a sharply demarcated beam of light either upon opaque or multi-faced translucent surfaces, to accurately tell time in a variety of geometric and aesthetic configurations.

2. Description of the Prior Art

Equatorial sundials have been known in the prior art for centuries. Most types of equatorial sundials cast a shadow from a gnomon forming a line upon a surface where the time is then read. The prior art also includes equatorial sundials which instead reflect or project unfocused light to indicate the time. These have included a masked reflecting mirror to cast a darkened line from the masking upon the dial as in U.S. Pat. No. 3,786,570 Davies; a reflected spot of light projected upon a translucent elliptical surface as in U.S. Pat. No. 5,197,199 Shrader; and a sunbeam that enters a hole in the top of a translucent sphere which casts a spot on the inside of the sphere allowing time to be read on the external surface of the device as in U.S. Pat. No. 89,585 Johnson. The limitations known in the prior art utilizing shadows is that they inherently form indistinct demarcations of time because of the penumbra the shadow creates and therefore these types of sundials are not able to give sharply defined demarcations for telling of time in a more precise manner.

The limitations known in the prior art with reflected un-focused light is that the width of the resultant image is blurred because it equals the width of the sun's image plus the width of the mirror. Each of the aforementioned sundials require a broad field or screen for the time to be displayed since each relies upon one light directing or shadow directing component of the device to function throughout the sun's total traverse across the horizon. This breadth of field or screen and lack of a sharply focused demarcation from the sun makes the reading of time from the sundial more difficult and in some instances requiring a modicum of study to discern the time.

A further limitation in the prior art is the difficulty in setting up and properly aligning the sundial accurately in accordance with the latitude where the sundial is located. The present invention utilizes an adjustable base assembly that permits a user to set up the sundial with exceptional accuracy.

Given the limitations of the prior art there is an apparent need for an equatorial sundial with an adjustable base assembly that utilizes a reflective means whereby the time indicator will be sharply focused and the visual field or screen of the time indicator may be narrowed, thereby making the dial easier to be read. The prior art's single component shadowing or reflecting time indicator source also limits the geometric and aesthetic configurations of sundials utilizing these designs. In this respect, the present invention disclosed herein substantially fulfills these needs.

SUMMARY OF THE INVENTION

In view of the foregoing limitations inherent in the known types of equatorial sundials present in the prior art, the present invention provides an apparatus that has been designed with an adjustable base assembly for easy and accurate installation which is able to indicate time by focusing the sun's light with one or more concave cylinrical focusing mirrors providing a sharply focused demarcated line capable of utilizing a narrow, easier read, dial or screen of various geometric and aesthetic configurations, which are improvements which are patently distinct over similar devices which may already be patented or commercially available. As such, the general purpose of the present invention, which will be described subsequently in greater detail, is to provide a new, novel and useful equatorial sundial with an adjustable base assembly that uses one or more concave cylindrical focusing mirrors to form a sharply demarcated beam of light either upon opaque or multi-faced translucent surfaces, to accurately tell time in a variety of geometric and aesthetic configurations. There are many additional novel features directed to solving problems not addressed in the prior art.

To attain this, the present invention generally comprises one or more cylindrical focusing mirrors which indicate the time by projecting a bright, sharply demarcated line whose width is determined solely by the angular width of the sun in the sky, and is not significantly broadened or degraded by increasing the width (aperture) of the mirror. A wider aperture (mirror width) would serve to increase the brightness, but not the width, of the focused line. This invention is an equatorial sundial with an adjustable base assembly which when configured with a plurality of concave cylindrical focusing mirrors measures units of time by projecting a sharply demarcated line of light onto a calibrated opaque or translucent surface indicating minutes past said unit of time which will repeat across this surface throughout the daylight hours in a number of units of time that is equal to the number of concave cylindrical focusing mirrors. For example because it takes one hour for the sun to move 15 degrees across the sky, movement of the reflected ray by 15 degrees will subtend a time of 1 hour as well and therefore an hour unit of time may be selected by utilizing one concave cylindrical focusing mirror for each hour. The adjustable base assembly is generally comprised of four rotatably attached components that permit a user to properly adjust the tilt of the sundial upon set-up accurately and easily according to the sundial's latitudinal location of use.

In the use of the present invention, the concave cylindrical focusing mirrors may be placed in a variety of differing positions and utilizing differing numbers of said concave cylindrical focusing mirrors in accordance with the desired field or screen for the reading of the time, which visual field or screen may also appear in a variety of geometric and aesthetic configurations and may be opaque or translucent to facilitate multi-surface reading of time.

The present invention is designed to overcome the present limitations inherent in equatorial sundials, namely imprecise installation and set-up, poorly focused time indicators and difficult to read visual field or screens for the telling of the time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims.

In this respect, before explaining at least one embodiment of the invention in detail, it is to be understood that the invention, method and apparatus, is not limited in its application to the details of construction and to the arrangements of the components set forth in the following description or illustrated in the drawings. The invention, method and apparatus, is capable of other embodiments and of being practiced and carried out in various ways. Also, it is to be understood that the phraseology and terminology employed herein are for the purpose of description and should not be regarded as limiting in any way the scope of this invention or claims made herein.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions and methods insofar as they do not depart from the spirit and scope of the present invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

It is therefore an object of the present invention to provide a new, novel and useful equatorial sundial, and more particularly to a new and novel equatorial sundial with an adjustable base assembly that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations which has many of the advantages of those mentioned heretofore and many novel features that result in an apparatus which is not anticipated, rendered obvious, suggested, or even implied by any of the prior art apparatuses, either alone or in any combination thereof.

It is another object of the present invention to provide an equatorial sundial, and more particularly to a new and novel equatorial sundial with an adjustable base assembly that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations which may be easily and efficiently manufactured, taught and marketed.

It is a further object of the present invention to provide an equatorial sundial, and more particularly to a new and novel equatorial sundial with an adjustable base assembly that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations which is of a durable and reliable construction.

An even further object of the present invention is to provide a precision high quality equatorial sundial, and more particularly to a new and novel equatorial sundial with an adjustable base assembly that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations, which despite its extremely high quality precision nature, is susceptible of a relatively low cost of manufacture with regard to both materials and labor, and which accordingly is then susceptible of relatively low prices of sale to the consuming public other than those ordinarily paid for with such high quality precision sundials, thereby making such an equatorial sundial, and more particularly to a new and novel equatorial sundial that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations economically available, in relative terms, to the buying public.

Still yet another object of the present invention is to provide an equatorial sundial, and more particularly to a new and novel equatorial sundial with an adjustable base assembly that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations which provides in the apparatuses of the prior art some of the advantages thereof, while simultaneously overcoming some of the disadvantages normally associated therewith.

These together with other objects of the invention, along with the various features of novelty which characterize the invention, shall be pointed out with particularity in the claims annexed to and forming a part of this disclosure upon the filing of the full application. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other that those set forth above will become apparent when consideration is given to the following detailed description thereof. Such description makes reference to the annexed drawings wherein.

DESCRIPTION OF PREFERRED EMBODIMENTS

Figure 1:
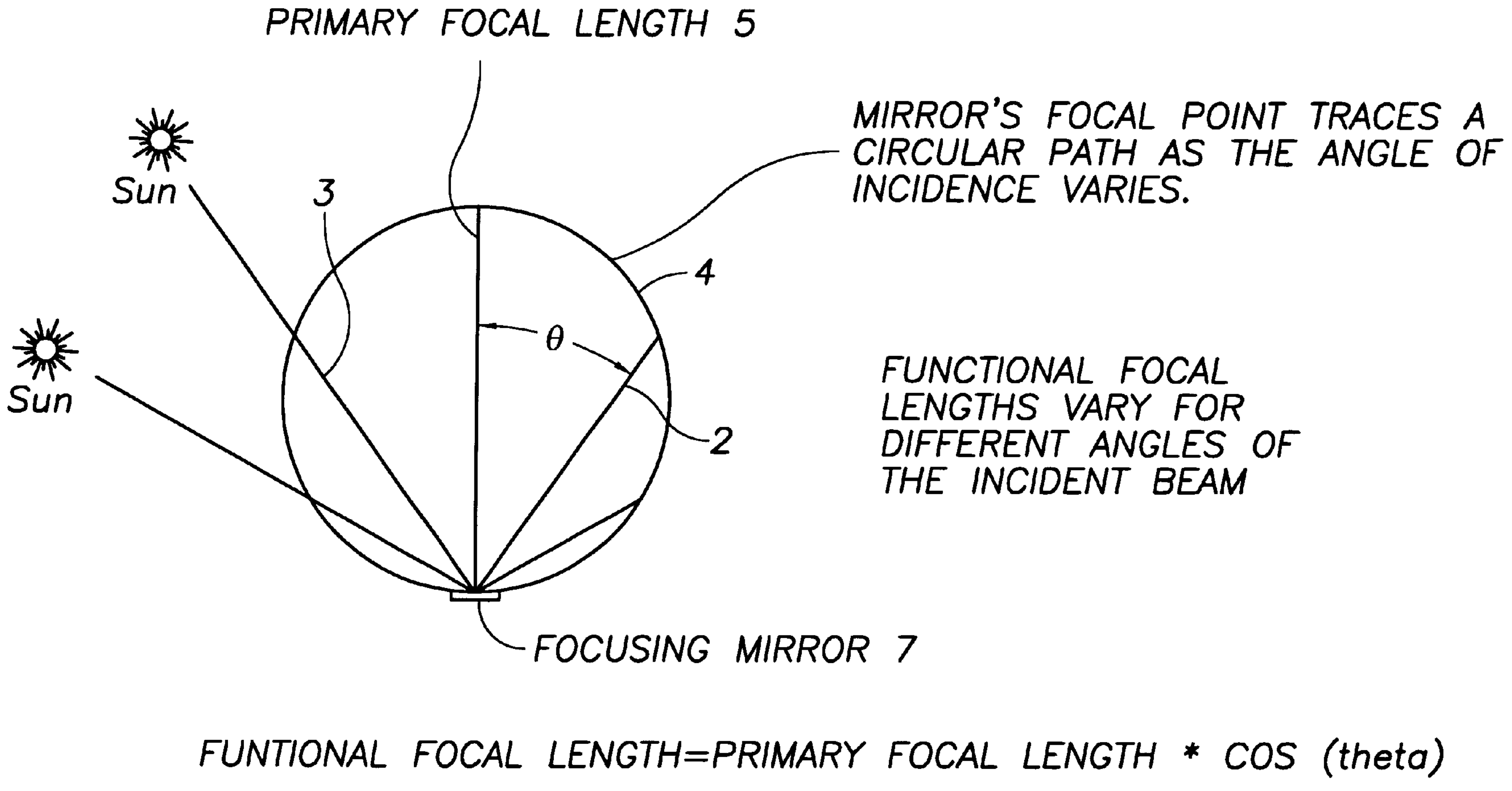
FIG. 1 is a planar depiction of the geometry involved in the utilization of concave cylindrical focusing mirrors in the present invention showing the focal lengths (primary and functional) of one of said mirrors.

With reference now to the drawings, and in particular to FIGS. 1–7 thereof, a new, novel and useful equatorial sundial with an adjustable base assembly that uses one or more concave cylindrical focusing mirrors to form a sharply demarcated beam of light either upon opaque or multi-faced translucent surfaces, which is quick, accurate and easy to install to tell time accurately in a variety of geometric and aesthetic configurations embodying the principles and concepts of the present invention and generally designated collectively by the reference numerals 20, 30, and 40 in FIGS. 1–7 will be described.

FIG. 1 depicts the geometry of how this invention works by describing the focal length of a concave cylindrical focusing mirror 7 varies according to the angle of incidence from the imaged object (in this case, the sun). By calculating the focal length 2 as a function of the angle of the incident light ray 3, the resulting graph describes a circle. This means that as the sun moves across the sky from morning to night, the focal point 4 of the mirror will fall along the circumference of a circle whose diameter equals the concave cylindrical focusing mirror's 7 primary focal length 5 (defined as the concave cylindrical focusing mirror's 7 focal length when the light source illuminates perpendicular to the concave cylindrical focusing mirrors' 7 surface). Also note that for each degree that the sun moves across the sky, the reflected beam moves 2 degrees around the circumference of the circle. This relationship holds true at all points around the circumference of the circle. Hence, as the sun moves 180 degrees across the sky, from 6AM to 6PM, it's image moves 360 degrees around the circumference of the circle, traveling 30 degrees per hour.

Figure 2:
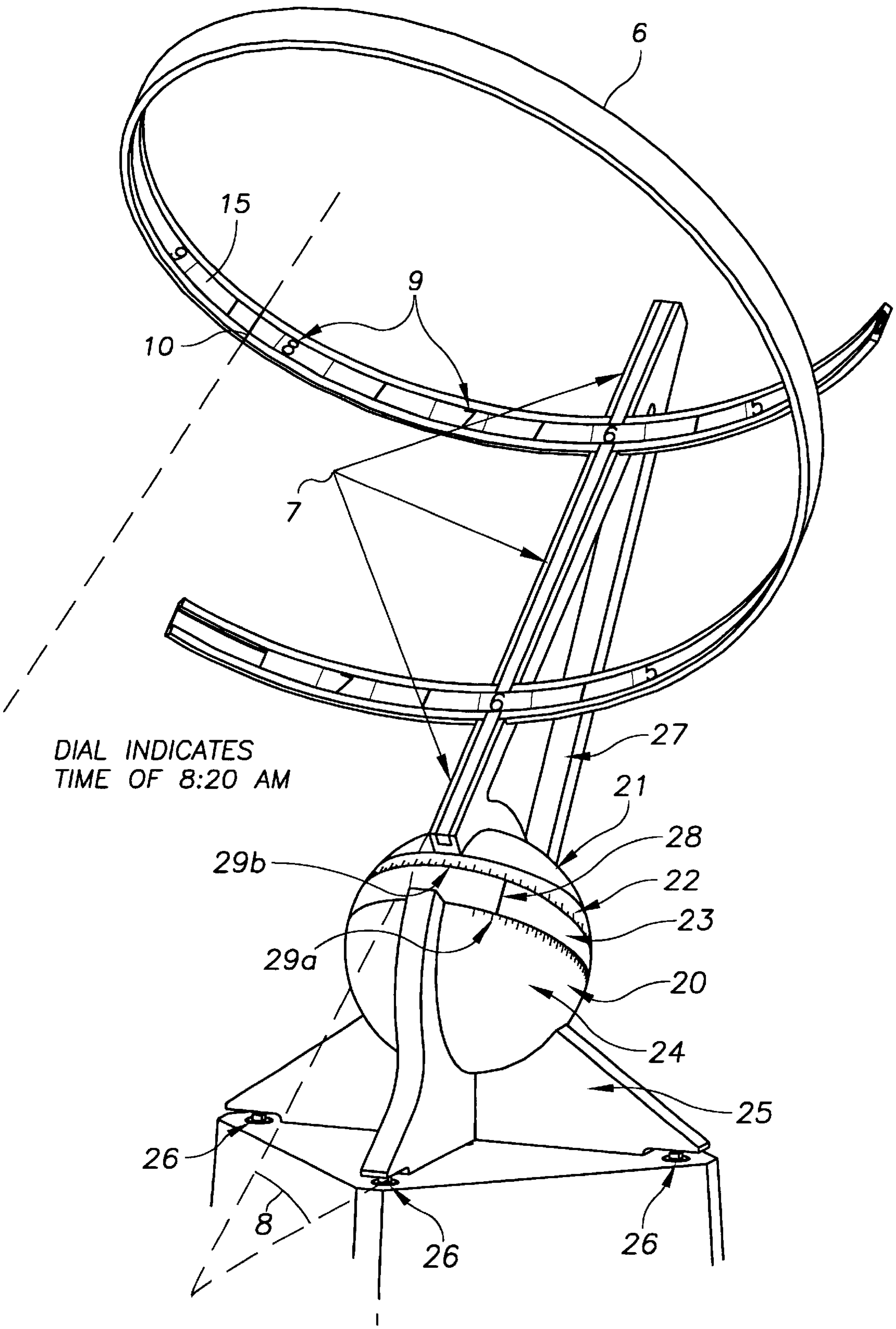
FIG. 2 is a perspective view of an equatorial sundial with an adjustable base assembly that utilizes one concave cylindrical focusing mirror forming a sharply demarcated beam of light upon an elliptical delineated field or screen configuration.
Figures 2A, 2B, 2C:
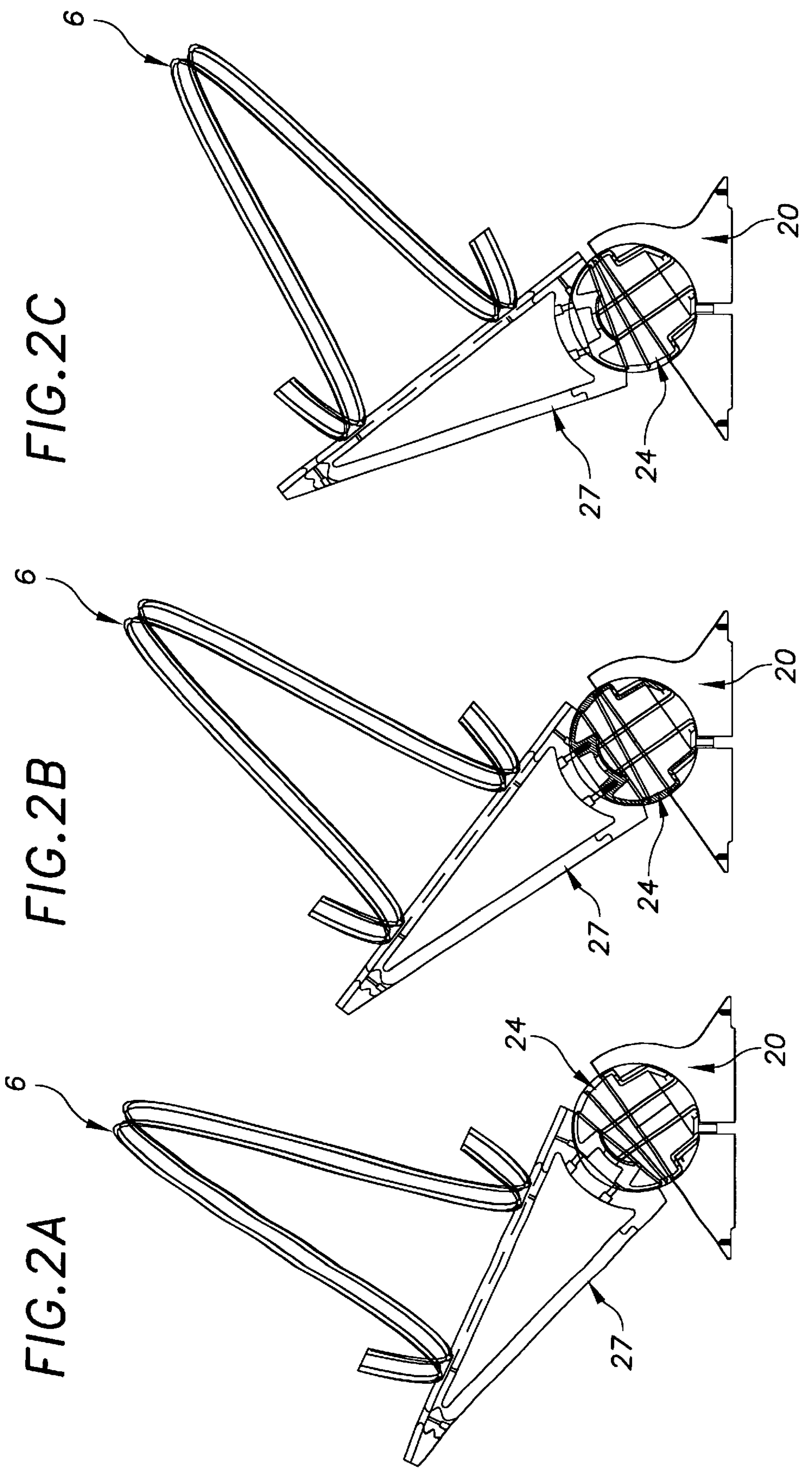
FIG. 2A is a cross-sectional view the equatorial sundial of FIG. 2 wherein the adjustable base assembly is adjusted so that the equatorial sundial is properly aligned for use at the lowest possible latitude of the equatorial sundial's functional range.
FIG. 2B is a cross-sectional view the equatorial sundial of FIG. 2 wherein the adjustable base assembly is adjusted so that the equatorial sundial is properly aligned for use at the latitude midway between the lowest possible latitude and the highest possible latitude of the equatorial sundial's functional range.
FIG. 2C is a cross-sectional view the equatorial sundial of FIG. 2 wherein the adjustable base assembly is adjusted so that the equatorial sundial is properly aligned for use at the highest possible latitude of the equatorial sundial's functional range.
Figure 3A:
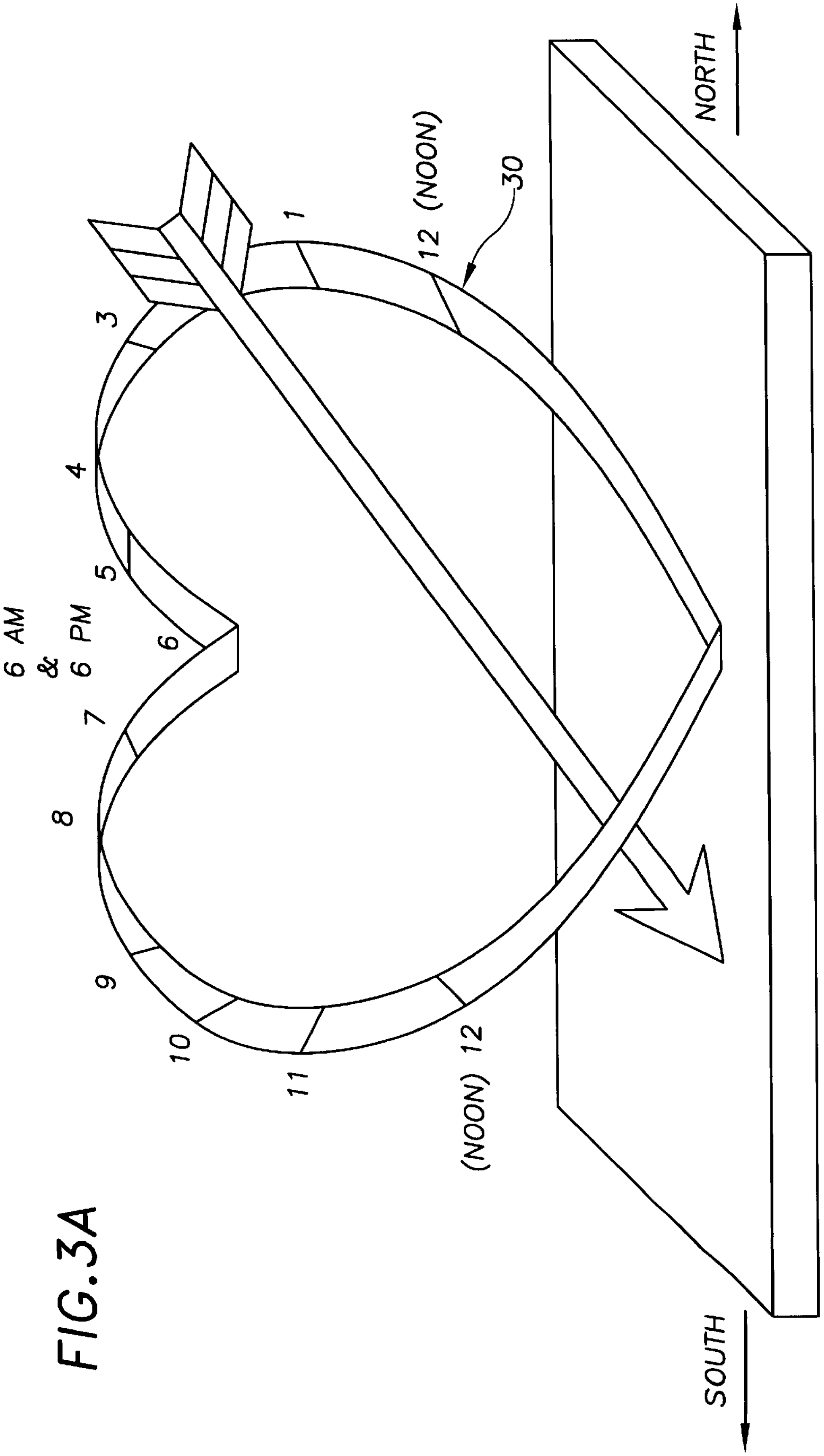
FIG. 3A is a perspective view of an equatorial sundial that utilizes two concave cylindrical focusing mirrors forming a sharply demarcated beam of light upon an aesthetically designed heart shaped delineated field or screen configuration.
Figure 3B:
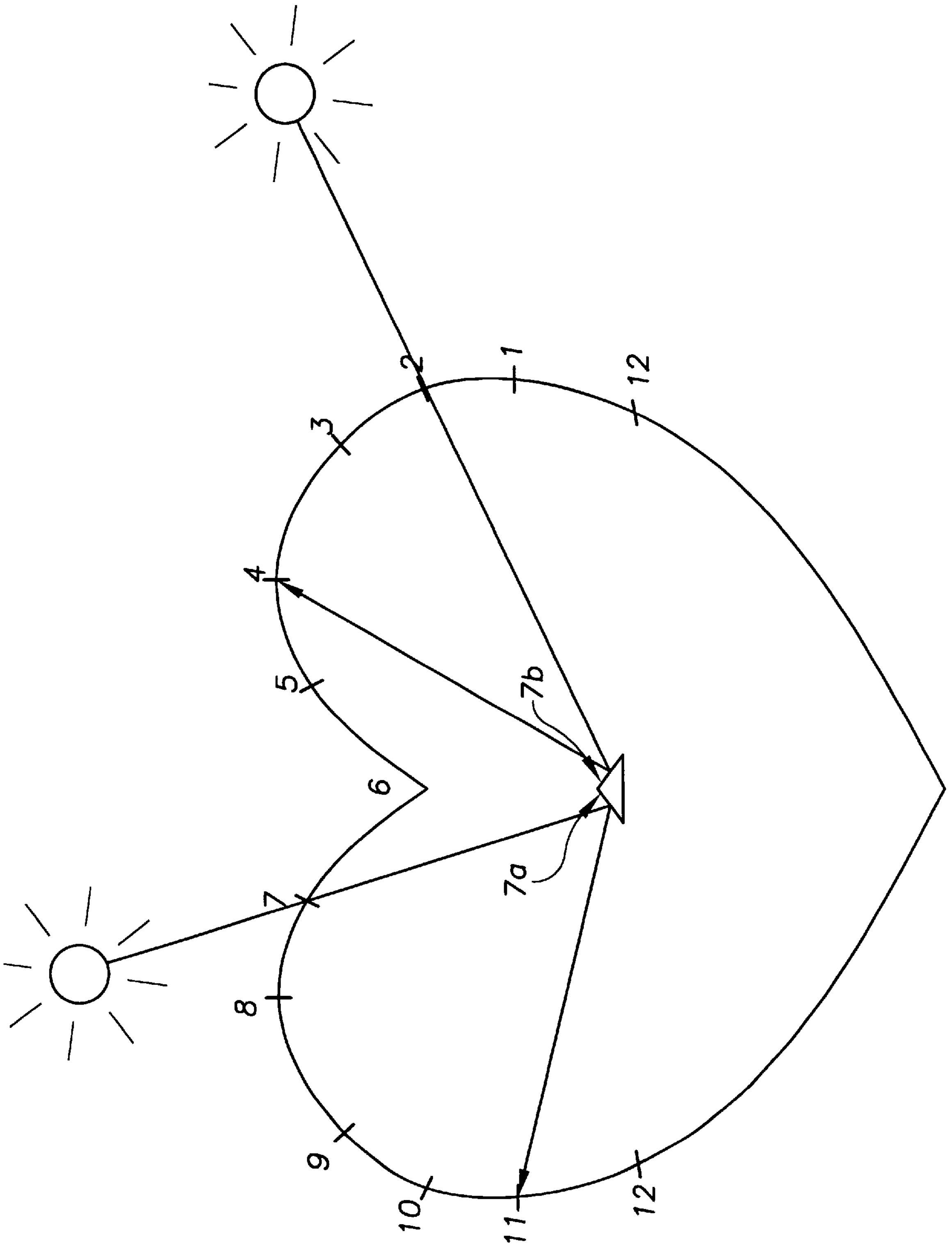
FIG. 3B is a planar depiction of the geometry involved in the utilization of two concave cylindrical focusing mirrors in the aesthetically designed heart shaped delineated field or screen configuration depicted in FIG. 3A.
Figure 4:
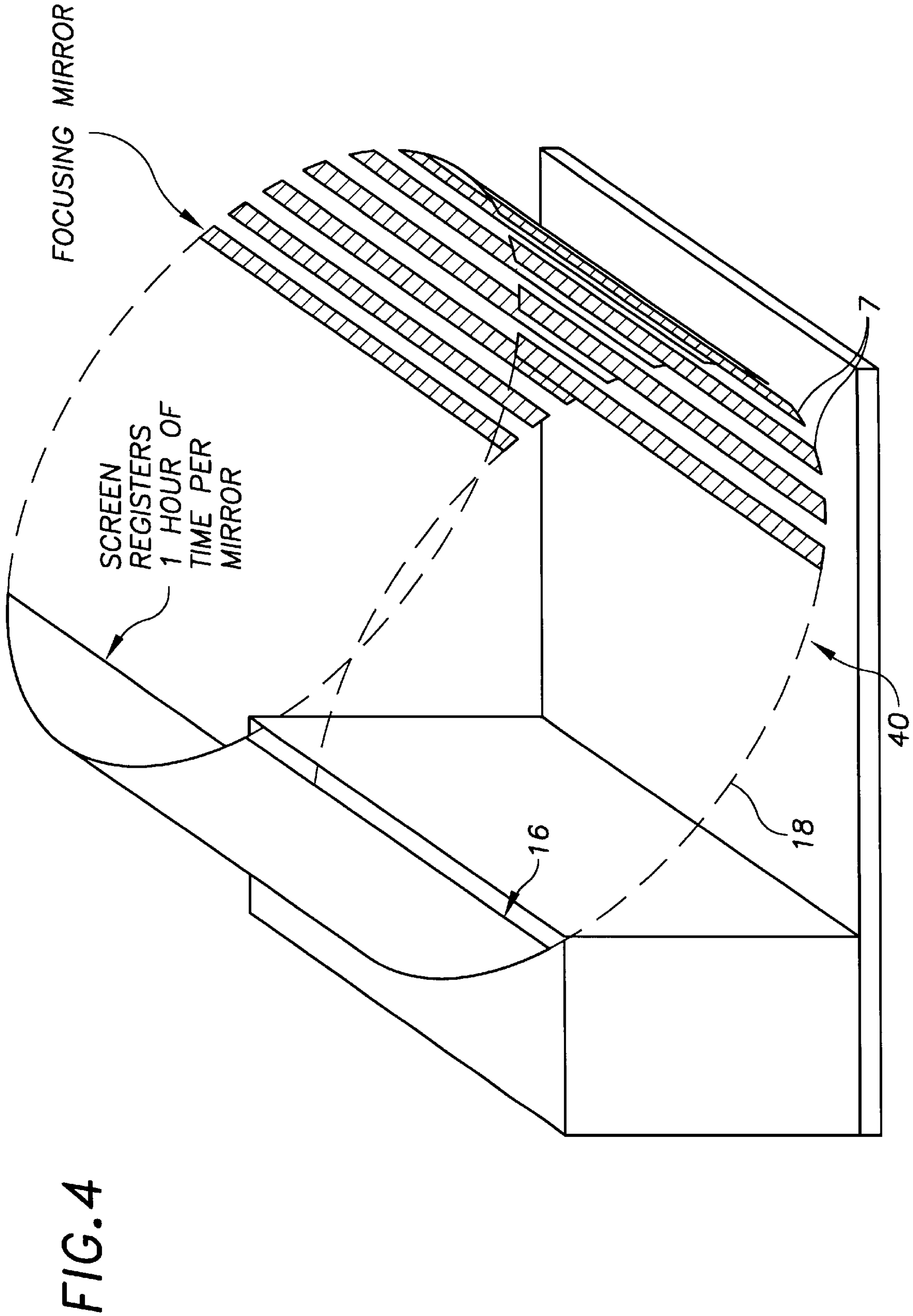
FIG. 4 is a perspective view of an equatorial sundial that utilizes sixteen concave cylindrical focusing mirrors forming a sharply demarcated beam of light upon a narrow delineated field or screen configuration which registers one hour of time per mirror.

The concave cylindrical focusing mirror 7 of the equatorial sundial 20 as depicted in FIG. 2, the concave cylindrical focusing mirrors 7*a* and 7*b* of the equatorial sundial 30 as depicted in FIGS. 3A and 3B, the concave cylindrical focusing mirrors 7 of the equatorial sundial 40 as depicted in FIG. 4 can be made of any durable, specularly reflecting, tarnish resistant material. Its primary focal length 5 as depicted in FIG. 1 will determine the diameter of the imaging surface (see below), and would most likely be 8 to 24 inches for most garden applications, and larger for more dramatic sundials. The width of the mirror should be about 1 to 3 times the width of the projected focused image of the sun, for an aperture f-stop in the range of 38 to 115. This generates an image that is neither too dim nor too bright. Of course, the reflectivity of the mirror's surface will also affect image brightness.

The preferred shape of the dial surface 15 as depicted in FIG. 2 onto which the concave cylindrical focusing mirror 7 would project is a spiral 6, because the spiral 6 as depicted in FIGS. 2, 2A, 2B and 2C is circular in cross section, and will not block the concave cylindrical focusing mirror 7 from the sun all day on the equinox, as would a simple circular surface. The diameter of the spiral 6 should equal the concave cylindrical focusing mirror's 7 primary focal length 5 as depicted in FIG. 1, as this will cause the reflected image to appear focused at all times.

The initial set up or installation of any embodiment of the present invention requires that the device be placed upon a stable level surface such that whatever the support means rests upon, or is removably attached to, is a level surface large enough to support the device. In the preferred embodiment depicted in FIG. 2 the device is shown resting upon a stable level surface large enough to support and contact the adjustable feet 26 of the base 25.

Figure 7:
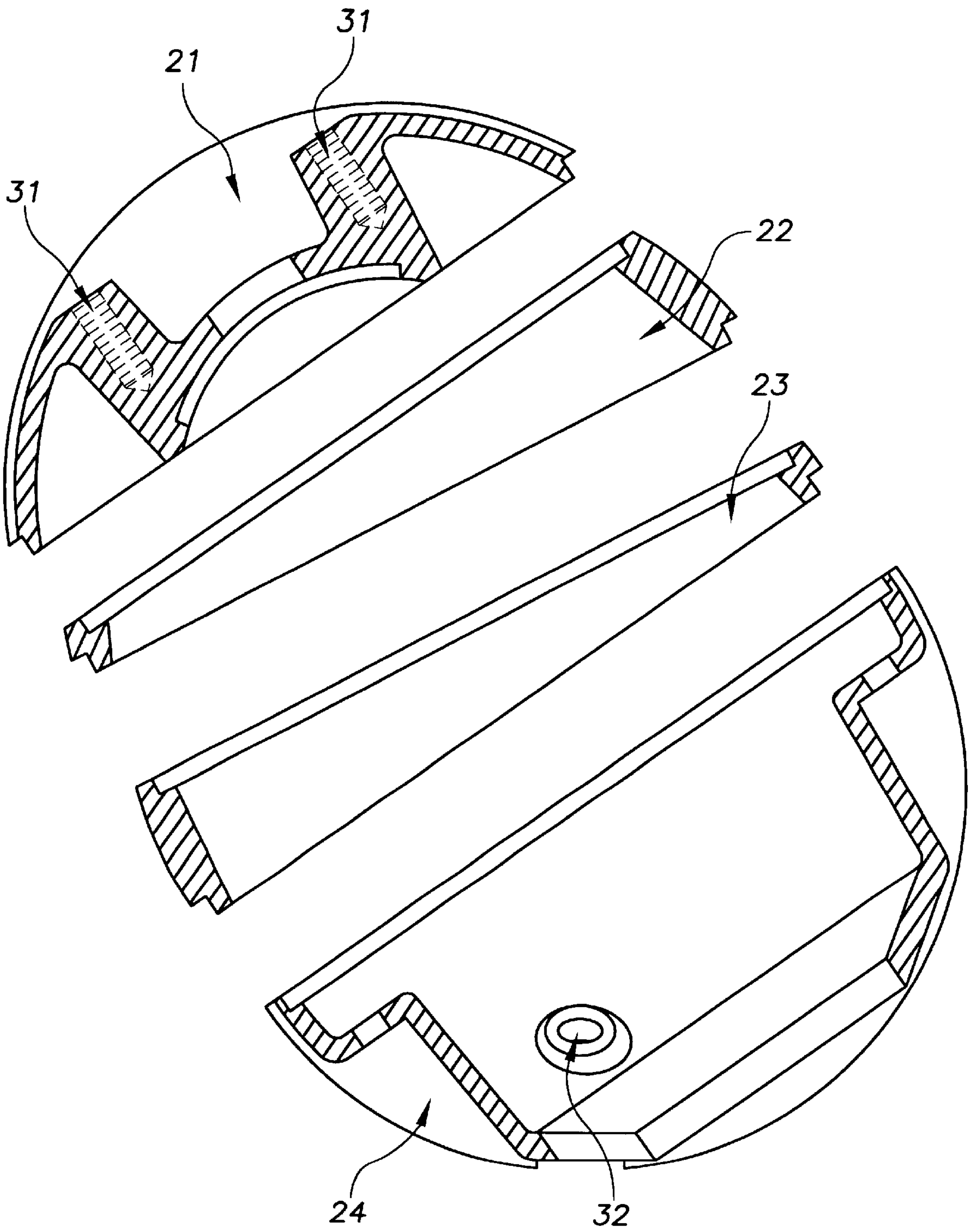
FIG. 7 is an exploded cross-sectional view of the base assembly depicted in FIGS. 2, 2A, 2B, and 2C which include the wedges depicted in FIGS. 6A, 6B, 6C, and 6D.

In order to utilize the present invention and read the time accurately from the sun once the device is properly supported, the concave cylindrical focusing mirror 7 of the equatorial sundial 20 as depicted in FIG. 2, the concave cylindrical focusing mirrors 7*a* and 7*b* of the equatorial sundial 30 as depicted in FIG. 3A and 3B, or the concave cylindrical focusing mirrors 7 of the equatorial sundial 40 as depicted in FIG. 4, is/are adjusted such that the cylindrical axis of the concave cylindrical focusing mirror(s) 7, 7*a* and 7*b* is/are parallel to the earth's axis. This is accomplished by aligning the concave cylindrical focusing mirror 7 of the equatorial sundial 20 as depicted in FIG. 2, the concave cylindrical focusing mirrors 7*a* and 7*b* of the equatorial sundial 30 as depicted in FIGS. 3A and 3B, the concave cylindrical focusing mirrors 7 of the equatorial sundial 40 as depicted in FIG. 4, such that the earth's north-south axis is parallel to the line defined by the cylindrical axis of the concave cylindrical focusing mirrors 7, 7*a* and 7*b*, and setting it inclined at an angle 8 equal in degrees to the local latitude. To adjust the equatorial sundial(s) 20, 30 and 40 to the proper angle 8 for use, each of the equatorial sundial(s) 20, 30 and 40 may use an adjustable base assembly shown in the preferred embodiment depicted in FIG. 2 and which adjustable base assembly is comprised of a bottom sphere portion 24, a bottom wedge 23, a top wedge 22, and a top sphere portion 21 and which bottom sphere portion 24 is removably attached to the base 25 utilizing a base attachment means 32 as depicted in FIG. 7. The bottom wedge 23 is functionally and rotatably attached about its axis to the bottom sphere portion 24 such that the flat surface of the bottom wedge 23 contacts the bottom sphere portion 24 as depicted in FIGS. 2, 2A, 2B and 2C. The top wedge 22 is functionally and rotatably attached about its axis to the bottom wedge 23 such that the angled surface of the bottom wedge 23 contacts the angled surface of the top wedge 22 as depicted in FIGS. 2, 2A, 2B and 2C. The top wedge 22 is also functionally and rotatably attached about its axis to the top sphere portion 21 such that the flat surface of the top wedge 22 contacts the top sphere portion 21 as depicted in FIGS. 2, 2A, 2B and 2C. The user then turns the bottom wedge 23 in the opposite direction of the top wedge 22 (i.e. if one is being turned clockwise, the other is turned counterclockwise) until the latitude alignment mark 28 is aligned with the latitude where the device is being installed as calibrated and indexed on the adjacent bottom latitude index 29*a* and top latitude index 29*b*. For example if the device is being installed at a latitude of 35° then the bottom wedge 23 and the top wedge 22 will be turned in opposite directions and aligned such that the latitude alignment mark 28 is aligned with the 35° index latitude mark of both the bottom latitude index 29*a* and top latitude index 29*b*. The indexed latitude marks on the scale of the top latitude index 29*b* is an indexing of corresponding latitude values. The amount of rotation ($R_2$) of the top wedge 22 on the bottom wedge 23 for a desired amount of tilt (T) is determined by the following formula:

$$R_2 = 2\arcsin(\sin(T/2)/\sin(N))$$

In this formula, N is an angle equal to one-fourth of the total desired adjustable range of latitude which is also the wedge angle of the top wedge 22 as depicted in FIGS. 2, 2A, 2B and 2C and the angles of which are more clearly depicted in FIGS. 6A, 6B, 6C, 6D and 7. N is also the wedge angle of the bottom wedge 23 as depicted in FIGS. 2, 2A, 2B and 2C and the angles of which are more clearly depicted in FIGS. 6A, 6B, 6C, 6D and 7. In this formula T equals the desired angle of tilt and cannot exceed 2 times N. The amount of rotation ($R_1$) of the bottom wedge 23 on the bottom sphere portion 24 is determined by the following formula:

$$R_1 = \arctan(\tan(R_2/2)\cos(N))$$

The top sphere portion 22 and the bottom sphere portion 24 remain in rotational alignment regardless of the rotational position(s) of the top wedge 22 and the bottom wedge 23.

In the preferred embodiment depicted in FIGS. 2, 2A, 2B and 2C the top sphere portion 21 is removably attached to the frame 27 utilizing the frame attachment means 31 as depicted in FIG. 7. The frame 27 supports the spiral 6 which has a removably attached dial surface 15 functionally located within a channel provided for its positioning by sliding within the spiral 6. The frame further supports the removably attached concave cylindrical focusing mirror 7.

As shown in FIG. 2 the spiral 6 dial surface 15 is oriented in relation to the concave cylindrical focusing mirror 7 such that the concave cylindrical focusing mirror's 7 surface fits flush against the inner circumference of the spiral 6, and that the axis of the spiral 6 dial surface 15 is parallel to the concave cylindrical focusing mirror's 7 axis as well as coplanar with the concave cylindrical focusing mirror's 7 axis and the focal point 1 of its primary focal length 5 as depicted in FIG. 1.

The geometry of this arrangement as depicted in FIG. 2 is such that the hour marks 9 on the spiral 6 dial surface 15 will be equally spaced 30 degrees apart. This equal spacing is possible only when the concave cylindrical focusing mirror 7 is at the circumference (the only other possible arrangement allowing equal spacing is when the mirror is at center of the spiral or circle, each hour being 15 degrees apart). The hour lines indicate the time from 6AM to 6 PM as noted.

As shown in FIG. 2 the reflected light from the sun will always be in focus where it strikes the inner portion of the dial surface 15, regardless of the angle of incidence. The width of the line 10 will be equal to 0.5 degrees, or 2 minutes. The local apparent time would be read at the center of this line, and can generally be inferred to the exact minute.

Still referring to the preferred embodiment depicted in FIG. 2 the removably attached dial surface 15 is functionally and slidably located within a channel provided for its positioning within the spiral 6 to correct for the difference between standard time and solar time caused by the device's position in the time zone, Daylight Savings Time, and/or the equation of time. The user would slide the dial surface 15 until the hour marks 9 on the spiral 6 dial surface 15 indicate the proper date on a graphic of the equation of time, at which point the device will be correctly set to read standard or clock time precisely. During Daylight Savings Time, the date would be set alongside the Daylight Savings Time indicator, which would be located one hour later than the hour marks 9 or 30° along the helix defined by the spiral 6 dial surface 15. The position of the dial surface 15 and its corresponding hour marks 9 within the channel of the spiral 6 will be dependent upon how many degrees the device's location is from the time zone's meridian.

This new design is not necessarily limited to a dial surface which is circular in cross section, nor to a single mirror. FIG. 3A shows a heart shaped dial 30 utilizing two concave cylindrical focusing mirrors 7*a* and 7*b* centrally placed inside a heart shaped dial surface as depicted in FIG. 3B. One concave cylindrical focusing mirror 7*a* registers the time from 6AM to noon, and the other concave cylindrical focusing mirror 7*b* from noon to 6PM. Time before 6AM and after 6PM would also be indicated, however the image would be de-focused and less accurately placed. The central concave cylindrical focusing mirrors 7*a* and 7*b* could be rotated to account for daylight savings and the equation of time.

The sundial 40 in FIG. 4 is constructed such that a curved screen 16 functions in the same manner as the dial surface 15 of FIG. 2 and is calibrated to indicate exactly 60 minutes, occupies a 30 degree arc on the circumference of a circle. As demonstrated above, by the geometry of this arrangement, a mirror placed anywhere on the circumference of this circle will reflect sunlight for exactly one hour on to the screen 16.

Opposite the screen 16, but also on the circumference of the circle, are placed a plurality of concave cylindrical focusing mirrors 7, each one of which will project on to the screen 16 for just one hour. The spacing between the concave cylindrical focusing mirrors 7 is such that no concave cylindrical focusing mirror 7 will be eclipsed by either the screen 16 or other concave cylindrical focusing mirrors 7 as it projects its designated hour. No concave cylindrical focusing mirror 7 faces the origin of the circle, but rather each concave cylindrical focusing mirror 7 is rotated the proper amount so that it will project the sun's image at the zero minute mark at exactly the start of its designated hour. In such a manner, a new line will traverse the screen 16 each hour, and only a single concave cylindrical focusing mirror 7 will project onto the screen at any time (except at the top of the hour, where the screen will be simultaneously lit by the waxing hour mirror at the 0 minute mark, and the waning hour mirror at the 60 minute mark). This setup accurately indicates the minutes past the hour (local apparent time), but does not indicate which hour. To indicate which hour is being recorded, an additional design is necessary. The hours can be indicated, for example, by traditional shadow casting methods. However, a more sophisticated system can be used in which each mirror projects a numerical image of its hour, as noted below.

Figure 4A:
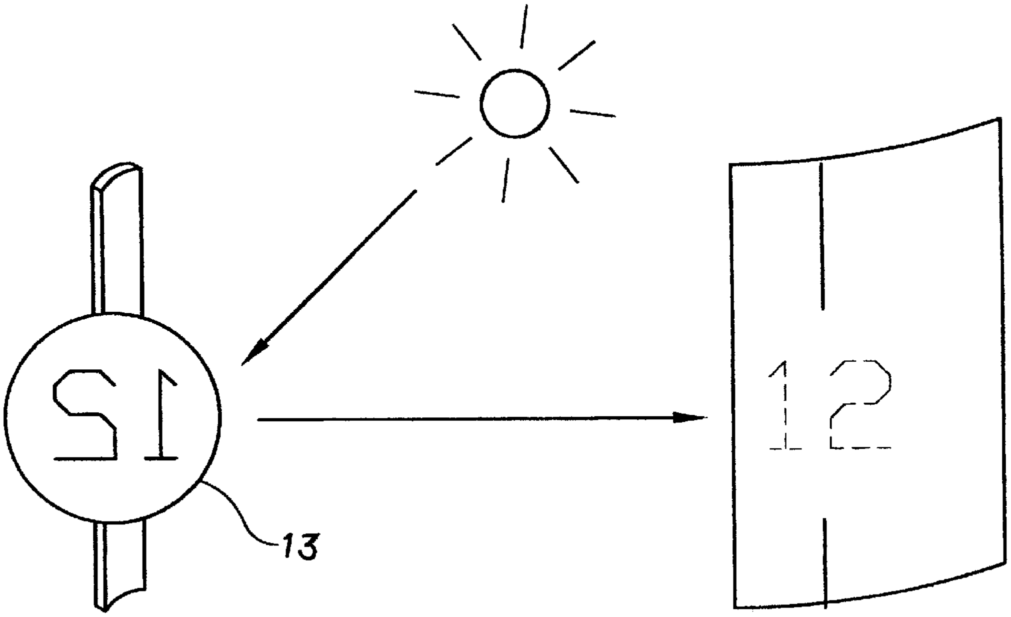
FIG. 4A is a perspective view of a masked flat mirror with the number twelve thereupon to depict that hour mounted upon a concave cylindrical focusing mirror and the geometry and resultant image cast upon the narrow delineated field or screen depicted in FIG. 4.
Figure 4B:
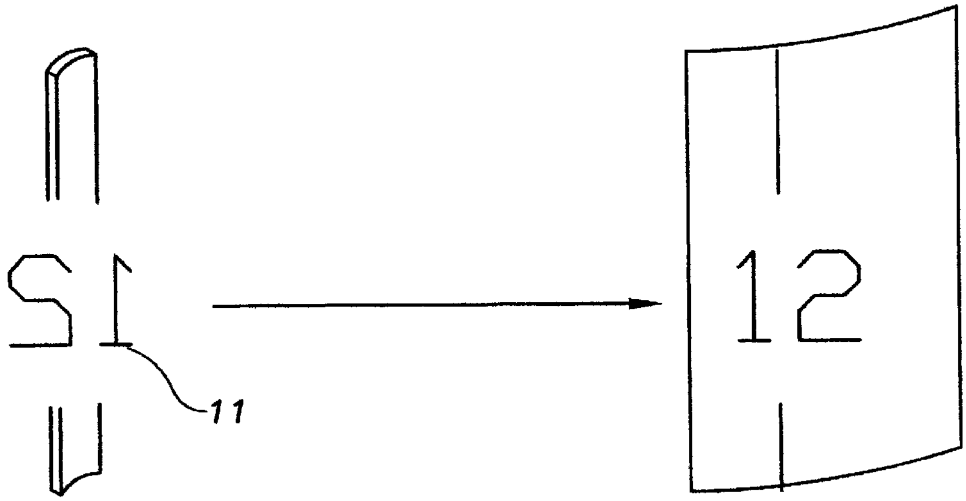
FIG. 4B is a perspective view of a number twelve constructed of sections of concave cylindrical focusing mirrors to depict that hour mounted upon a concave cylindrical focusing mirror and the geometry and resultant image cast upon the narrow delineated field or screen depicted in FIG. 4.
Figure 5:
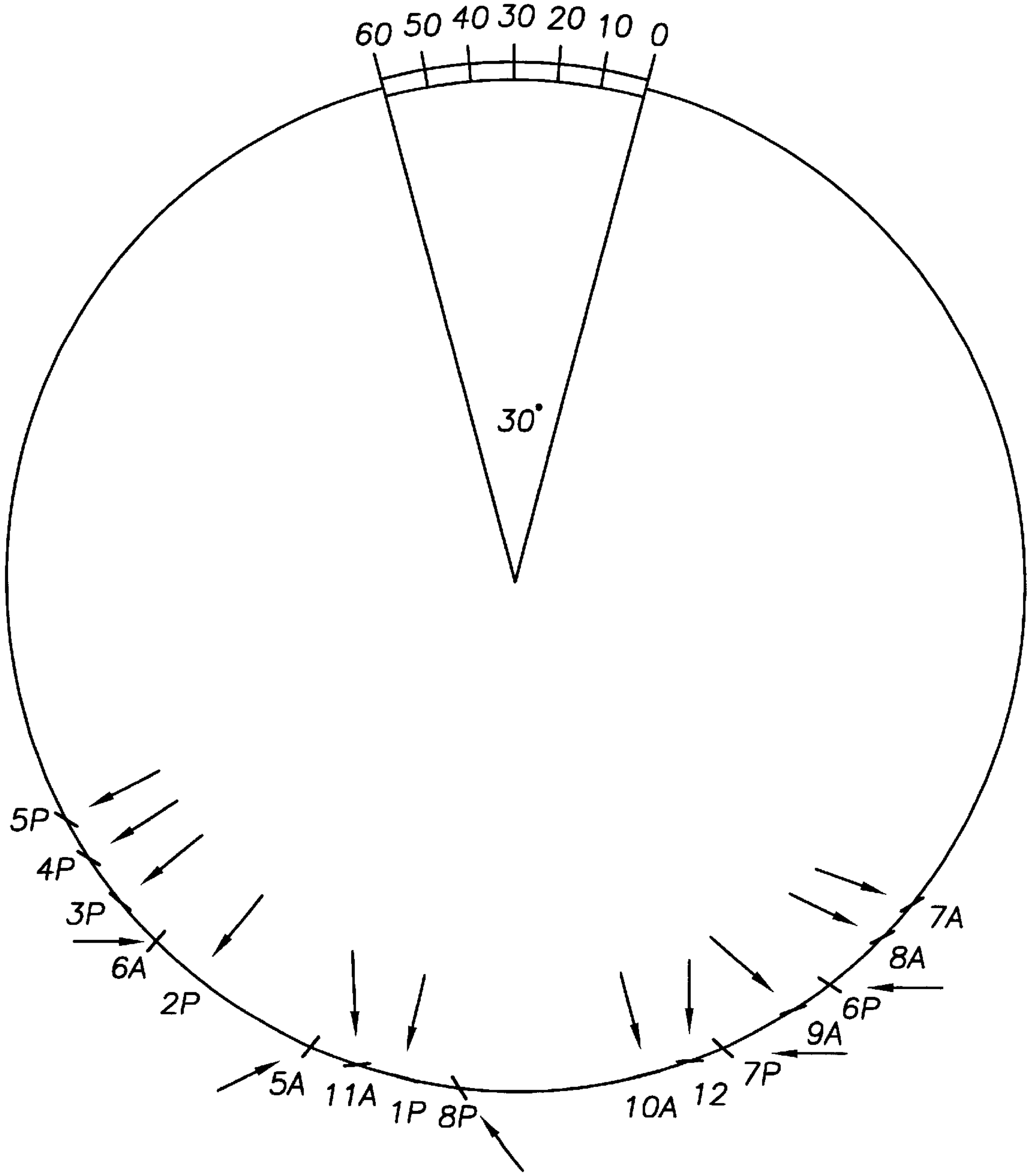
FIG. 5 is a planar depiction of the geometry involved in the utilization of the concave cylindrical focusing mirrors as it focuses a beam of light upon the narrow delineated field or screen depicted in FIG. 4 at different hours of daylight.
Figures 6A, 6B, 6C, 6D:
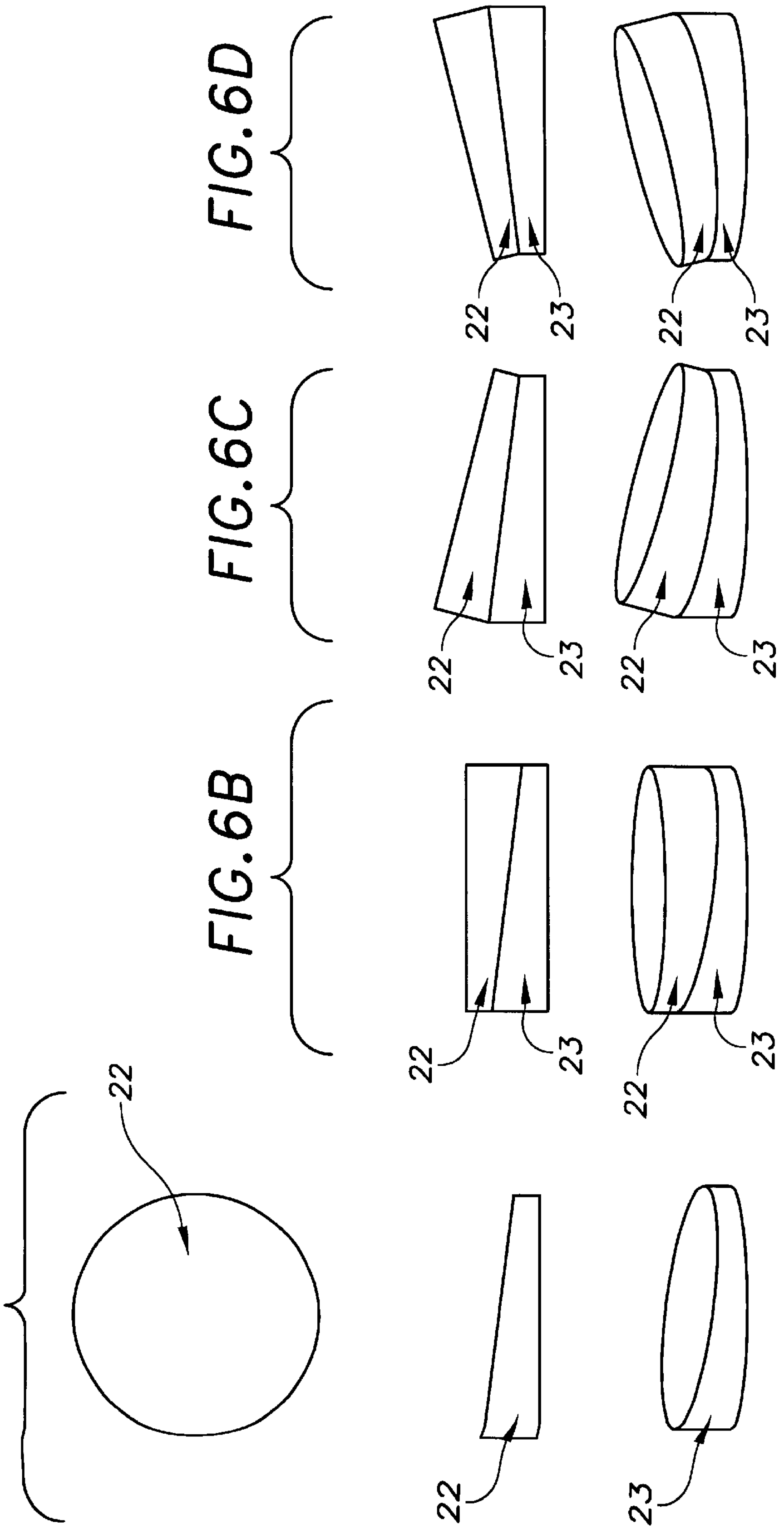
FIG. 6A is a top, side and perspective view of one of the wedges of the adjustable base assembly of the equatorial sundial depicted in FIG. 2.
FIG. 6B is a side and perspective view of the two wedges of the adjustable base assembly of the equatorial sundial depicted in FIG. 2B, functionally aligned such that the equatorial sundial is properly aligned for use at the latitude midway between the lowest possible latitude and the highest possible latitude of the equatorial sundial's functional range.
FIG. 6C is a side and perspective view of the two wedges of the adjustable base assembly of the equatorial sundial depicted in FIG. 2C, functionally aligned such that the equatorial sundial is properly aligned for use at the highest possible latitude of the equatorial sundial's functional range.
FIG. 6D is a side and perspective view of the two wedges of the adjustable base assembly of the equatorial sundial depicted in FIG. 2A, functionally aligned such that the equatorial sundial is properly aligned for use at the lowest possible latitude of the equatorial sundial's functional range.

As shown in FIGS. 4, 4*a* and 4*b* the concave cylindrical focusing mirrors 7 can be made of any durable, specularly reflecting, tarnish resistant material. Their primary focal length 5 will determine the diameter of the imaging cylinder 18 (see below), and would be 12 to 24 inches for most garden applications, and larger for more dramatic dials. The width of the mirror should be about 1 to 3 times the width of the projected focused image of the sun, for an aperture f-stop in the range of 38 to 115. This generates an image that is neither too dim nor too bright. Of course, the reflectivity of the concave cylindrical focusing mirror's 7 surface will also affect image brightness. The screen 16 and the concave cylindrical focusing mirrors 7 are all parallel to each other, and hence describe the circumference of an imaginary cylinder 18. The axis of the cylinder 18 must be oriented parallel to the earth's axis. This is accomplished by constructing the sundial 40 such that all the elements are tilted at an angle equal to the latitude of the sundial's 40 location, and oriented along the north-south meridian. Because each concave cylindrical focusing mirror 7 performs its duty while facing off axis to the sun as depicted in FIG. 5, its functional focal length (defined as the distance from the concave cylindrical focusing mirror 7 to the center of the screen 16) will be a little smaller than its primary focal length 5 as depicted in FIG. 1. For practical considerations, most of the concave cylindrical focusing mirrors 7 would be ground with same primary focal 5 length, which would equal, or slightly exceed, the diameter of the circle. In order to allow the concave cylindrical focusing mirrors 7 which are rotated at an extreme angle to the screen 16 (5&6AM; 6,7,&8PM) to project a focused image, their primary focal length 5 would have to considerably larger than the other mirrors. As depicted in FIG. 1 the primary focal length 5 can be calculated from their functional focal length 2 as follows: Primary focal length 5=Functional focal length 2/(sin[$\Theta$+90]). The arrangement as shown prevents the function of each concave cylindrical focusing mirror 7 from being eclipsed by other concave cylindrical focusing mirrors 7 or the screen 16.

As depicted in FIGS. 4*a* and 4*b* attached to the face of each concave cylindrical focusing mirror 7 would be a mirror image of the numeral of the hour during which that concave cylindrical focusing mirror 7 casts a line upon the screen 16. This numeral would be constructed from a planar (non-focusing) mirror 13, and would project an un-focused, but readable, image of the numeral hour which would be superimposed over the focused line indicating minutes. Alternatively, this numeral could be constructed as a composite of small segments of a cylindrical focusing mirror 11, and would create a sharply focused image of the hour numeral.

The sundial 40 can be made to directly indicate Standard Mean Time, rather than Local Apparent Time, by mounting it on a base (not shown) which can be rotated parallel to the Earth's axis by an amount so as to correct for the equation of time, and/or Daylight Savings Time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For instance the adjustments of the tilt 8 and the adjustments for Daylight Savings Time and equation of time, etc. on the dial surface 15 all could be accomplished by electro-mechanical means.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and novel and desired to be protected by Letters Patent of the United States is as follows:

1. An equatorial sundial apparatus comprising:

a base;

at least one concave cylindrical focusing mirror adjustably and removably attached to the base;

the concave cylindrical focusing mirror having a functional focal length; a dial surface removably, adjustably and functionally attached to the concave cylindrical focusing mirror such that the dial surface is geometrically shaped and positioned a distance from the concave cylindrical focusing mirror equal to the functional focal length;

the dial surface having a mirror facing side and a mirror opposing side; and the mirror facing side having hour marks that generally face the concave cylindrical focusing mirror and the hour marks being illuminated by the sunlight which is reflected and focused by the concave cylindrical focusing mirror during daylight hours indicating the time of day thereby.

2. The equatorial sundial apparatus as described in claim 1 wherein the concave cylindrical focusing mirror further include functionally and removably attached planar mirrors which are shaped as mirror images of the hours of the day.

3. The equatorial sundial apparatus as described in claim 1 wherein the concave cylindrical focusing mirror further include functionally and removably attached concave cylindrical focusing mirrors which are shaped as mirror images of the hours of the day.

4. The equatorial sundial apparatus as described in claim 1 wherein the device utilizes a plurality of the concave cylindrical focusing mirrors configured with one or more of the dial surface to form a functional equatorial sundial with a designer specified aesthetic appearance.

5. The equatorial sundial apparatus as described in claim 1 wherein the dial surface is fixed.

6. The equatorial sundial apparatus as described in claim 1 wherein the base further comprises a leveling means.

7. An equatorial sundial apparatus comprising:

a base;

the base comprising a bottom portion, a bottom wedge, a top wedge, a top portion and an indexing means for adjusting the bottom wedge and the top wedge to the user's latitude;

the bottom portion having a top side;

the bottom wedge forms an angle equal to 25% of the desired latitudinal range of adjustment;

the top wedge forms an angle equal to 25% of the desired latitudinal range of adjustment;

the top portion having a bottom side and a top side;

the bottom wedge is rotatably attached to the top side of the bottom portion;

the top wedge is rotatably attached to the bottom wedge;

the top portion is rotatably attached to the top wedge such that the bottom side of the top portion is adjacent to the top wedge;

at least one concave cylindrical focusing mirror removably attached to the top side of the top portion of the base;

the concave cylindrical focusing mirror having a functional focal length;

a dial surface removably, adjustably and functionally attached to the concave cylindrical focusing mirror such that the dial surface is geometrically shaped and positioned a distance from the concave cylindrical focusing mirror equal to the functional focal length;

the dial surface having a mirror facing side and a mirror opposing side; and the mirror facing side having hour marks that generally face the concave cylindrical focusing mirror and the hour marks being illuminated by the sunlight which is reflected and focused by the concave cylindrical focusing mirror during daylight hours indicating the time of day thereby.

8. The equatorial sundial apparatus as described in claim 7 wherein the concave cylindrical focusing mirror further include functionally and removably attached planar mirrors shaped as mirror images of the hours of the day.

9. The equatorial sundial apparatus as described in claim 7 wherein the concave cylindrical focusing mirror further include functionally and removably attached concave cylindrical focusing mirrors which are shaped as mirror images of the hours of the day.

10. The equatorial sundial apparatus as described in claim 7 wherein the device utilizes a plurality of the concave cylindrical focusing mirrors configured with one or more of the dial surface to form a functional equatorial sundial with a designer specified aesthetic appearance.

11. The equatorial sundial apparatus as described in claim 7 wherein the dial surface is fixed.

12. The equatorial sundial apparatus as described in claim 7 wherein the base further comprises a leveling means.

* * * * *